United States Patent
Falco et al.

(10) Patent No.: US 9,246,780 B2
(45) Date of Patent: Jan. 26, 2016

(54) SYSTEM AND METHOD FOR SUPPORTING PORT MULTIPLEXING IN A SERVER ENVIRONMENT

(71) Applicant: Oracle International Corporation, Redwood Shores, CA (US)

(72) Inventors: Mark Falco, Burlington, MA (US); Ballav Bihani, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 390 days.

(21) Appl. No.: 13/671,420

(22) Filed: Nov. 7, 2012

(65) Prior Publication Data
US 2014/0108664 A1 Apr. 17, 2014

Related U.S. Application Data

(60) Provisional application No. 61/714,100, filed on Oct. 15, 2012.

(51) Int. Cl.
| | |
|---|---|
| G06F 15/16 | (2006.01) |
| H04L 12/26 | (2006.01) |
| G06F 17/30 | (2006.01) |
| H04L 29/08 | (2006.01) |
| G06F 11/16 | (2006.01) |
| G06F 11/20 | (2006.01) |
| H04L 12/24 | (2006.01) |

(52) U.S. Cl.
CPC ............ *H04L 43/0811* (2013.01); *G06F 11/16* (2013.01); *G06F 11/2041* (2013.01); *G06F 11/2097* (2013.01); *G06F 17/30067* (2013.01); *G06F 17/30371* (2013.01); *H04L 67/1095* (2013.01); *G06F 11/2048* (2013.01); *G06F 2201/82* (2013.01); *H04L 41/0668* (2013.01)

(58) Field of Classification Search
None
See application file for complete search history.

(56) References Cited

U.S. PATENT DOCUMENTS

| | | | |
|---|---|---|---|
| 5,014,265 A | 5/1991 | Hahne et al. | |
| 5,301,350 A | 4/1994 | Rogan et al. | |
| 5,561,785 A | 10/1996 | Blandy et al. | |
| 5,784,698 A | 7/1998 | Brady et al. | |
| 6,070,202 A | 5/2000 | Minkoff et al. | |
| 6,338,112 B1 | 1/2002 | Wipfel et al. | |
| 6,826,597 B1 | 11/2004 | Lonnroth et al. | |
| 7,058,055 B2 | 6/2006 | Mugica et al. | |
| 7,139,925 B2 | 11/2006 | Dinker et al. | |
| 7,861,249 B2 | 12/2010 | Jiang et al. | |
| 7,936,753 B1 | 5/2011 | Colloff | |

(Continued)

OTHER PUBLICATIONS

Sustrik et al. "Grok base: Subports" published on Jul. 27, 2011.*

(Continued)

*Primary Examiner* — Joshua Joo
*Assistant Examiner* — Younes Naji
(74) *Attorney, Agent, or Firm* — Tucker Ellis LLP

(57) ABSTRACT

A system and method can support port multiplexing in a server environment, e.g. in a distributed data grid. The server environment can comprise a port to receive one or more request, wherein the port is adapted to be associated with different port address values and the port operates to receive one or more connection requests. Additionally, the server environment allows a plurality of sockets to utilize the different port address values to support multiplexing of sockets over the port, and a multiplexed socket provider can be used to provide the plurality of sockets.

21 Claims, 3 Drawing Sheets

(56) References Cited

U.S. PATENT DOCUMENTS

| | | | |
|---|---|---|---|
| 8,131,894 B2 | 3/2012 | Cain et al. | |
| 8,249,072 B2 | 8/2012 | Sugumar et al. | |
| 8,259,571 B1* | 9/2012 | Raphel et al. | 370/230 |
| 8,271,980 B2 | 9/2012 | Jackson | |
| 8,290,919 B1 | 10/2012 | Kelly et al. | |
| 8,392,368 B1 | 3/2013 | Kelly et al. | |
| 8,539,192 B2 | 9/2013 | Castillo et al. | |
| 8,612,386 B2 | 12/2013 | Tien et al. | |
| 8,687,636 B1* | 4/2014 | Sivan et al. | 370/392 |
| 8,768,981 B1 | 7/2014 | Milne et al. | |
| 2002/0023173 A1 | 2/2002 | Jacobs et al. | |
| 2002/0196782 A1* | 12/2002 | Furukawa et al. | 370/352 |
| 2004/0083317 A1 | 4/2004 | Dickson et al. | |
| 2004/0172618 A1 | 9/2004 | Marvin | |
| 2005/0249215 A1 | 11/2005 | Kelsey et al. | |
| 2006/0112174 A1 | 5/2006 | L'Heureux et al. | |
| 2006/0129516 A1 | 6/2006 | Bradford et al. | |
| 2007/0168336 A1 | 7/2007 | Ransil et al. | |
| 2007/0230477 A1* | 10/2007 | Worley | 370/395.3 |
| 2008/0320501 A1 | 12/2008 | Li et al. | |
| 2009/0116484 A1 | 5/2009 | Buford | |
| 2009/0177914 A1 | 7/2009 | Winchell | |
| 2009/0219820 A1* | 9/2009 | Acke et al. | 370/241 |
| 2010/0005472 A1 | 1/2010 | Krishnaraj et al. | |
| 2010/0011414 A1* | 1/2010 | Banerjee et al. | 726/3 |
| 2010/0017461 A1 | 1/2010 | Kokkevis et al. | |
| 2010/0037222 A1 | 2/2010 | Tatsubori et al. | |
| 2010/0042755 A1 | 2/2010 | Fuente et al. | |
| 2010/0060934 A1 | 3/2010 | Bellert | |
| 2010/0093441 A1* | 4/2010 | Rajaraman et al. | 463/42 |
| 2010/0265945 A1 | 10/2010 | Bejerano et al. | |
| 2010/0333099 A1 | 12/2010 | Kupferschmidt et al. | |
| 2011/0004701 A1 | 1/2011 | Panda et al. | |
| 2011/0225120 A1 | 9/2011 | Cooper et al. | |
| 2011/0225121 A1 | 9/2011 | Cooper et al. | |
| 2011/0225122 A1 | 9/2011 | Denuit et al. | |
| 2011/0296052 A1* | 12/2011 | Guo et al. | 709/240 |
| 2012/0113896 A1 | 5/2012 | Karol | |
| 2012/0197840 A1 | 8/2012 | Oliver et al. | |
| 2012/0197959 A1 | 8/2012 | Oliver et al. | |
| 2012/0198455 A1 | 8/2012 | Lee et al. | |
| 2012/0278398 A1 | 11/2012 | Lowekamp | |
| 2012/0331029 A1 | 12/2012 | King, III et al. | |
| 2013/0014114 A1 | 1/2013 | Nagata | |
| 2013/0073809 A1 | 3/2013 | Antani et al. | |
| 2013/0074101 A1 | 3/2013 | Oliver et al. | |
| 2013/0128726 A1 | 5/2013 | Hellhake et al. | |
| 2013/0262632 A1 | 10/2013 | Fein | |
| 2013/0325543 A1 | 12/2013 | Magee et al. | |
| 2014/0016457 A1 | 1/2014 | Enyedi et al. | |
| 2014/0219209 A1 | 8/2014 | Soneda et al. | |

OTHER PUBLICATIONS

Tanenbaum, Andrew S., "*Modern operating systems*" Prentice-Hall, Inc., Upper Saddle River, New Jersey, 2001. 5 pages.
Tanenbaum, Andrew S., Computer Networks, Fourth Edition 2003, Prentice Hall PTR, Chapter 5.2.7 Broadcast Routing, 3 pages.

\* cited by examiner

SYSTEM AND METHOD FOR SUPPORTING PORT MULTIPLEXING IN A SERVER ENVIRONMENT

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by inventors Robert H. Lee, Gene Gleyzer, Charlie Helin, Mark Falco, Ballav Bihani and Jason Howes, filed Oct. 15, 2012, which application is herein incorporated by reference.

CROSS-REFERENCED APPLICATIONS

The current application hereby incorporates by reference the material in the following patent applications:

U.S. patent application Ser. No. 13/671,433, entitled "SYSTEM AND METHOD FOR SUPPORTING A SELECTION SERVICE IN A SERVER ENVIRONMENT," by inventors Mark Falco and Ballav Bihani, filed Nov. 7, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting a server environment.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support port multiplexing in a server environment, e.g. in a distributed data grid. The server environment can comprise a port to receive one or more request, wherein the port is adapted to be associated with different port address values and the port operates to receive one or more connection requests. Additionally, the server environment allows a plurality of sockets to utilize the different port address values to support multiplexing of sockets over the port, and a multiplexed socket provider can be used to provide the plurality of sockets.

DETAILED DESCRIPTION

Figure 1:
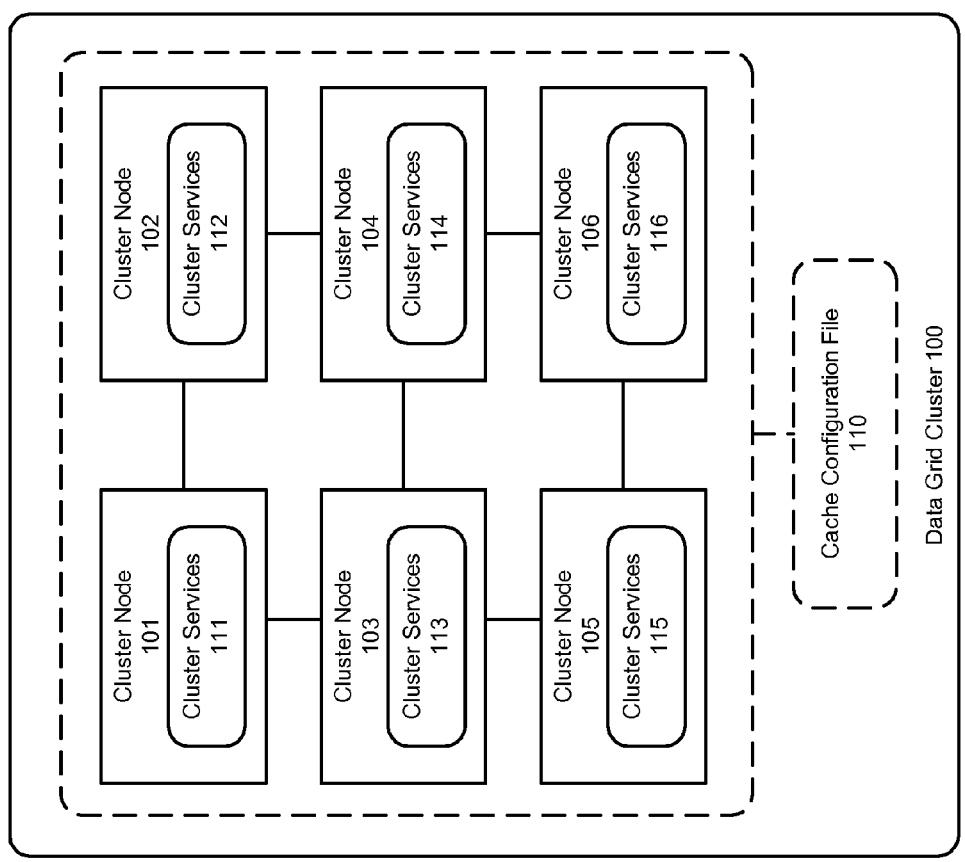
FIG. 1 is an illustration of a data grid cluster in accordance with various embodiments of the invention.

Described herein are systems and methods that can support port multiplexing in a server environment, e.g. in a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100 includes a plurality of cluster nodes 101-106 having various cluster services 111-116 running thereon. Additionally, a cache configuration file 110 can be used to configure the data grid cluster 100.

Port Multiplexing

In accordance with an embodiment of the invention, port multiplexing can be beneficial in a server environment, e.g. in a distributed data grid. Using port multiplexing, a server environment can reduce the number of physical ports that are needed to be maintained by IT professionals.

Figure 2:
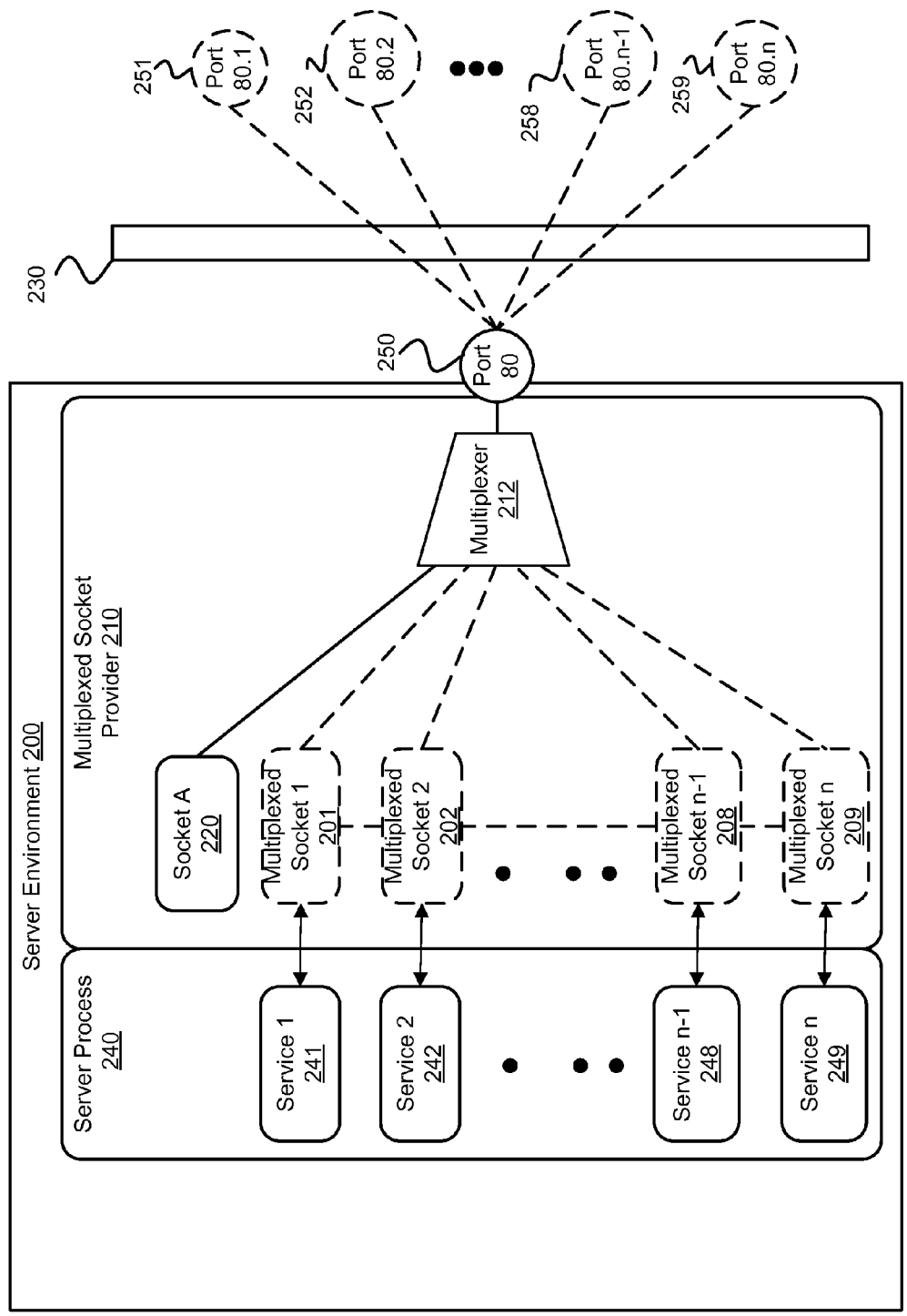
FIG. 2 shows an illustration of supporting port multiplexing in a server environment, in accordance with an embodiment of the invention.

FIG. 2 shows an illustration of supporting port multiplexing in a server environment, in accordance with an embodiment of the invention. As shown in FIG. 2, a server environment 200 can support a plurality of multiplexed sockets 201-209, e.g. multiplexed sockets 1 to N, that share a single physical port 250, e.g. a Transmission Control Protocol (TCP) port 80. The single physical port 250 can be multiplexed into several virtualized ports, or sub-ports 251-259, e.g. TCP port 80.1 to 80.$n$, each of which can be handled by one of the plurality of multiplexed sockets 201-209.

Each multiplexed socket can listen to the single physical port 250 for incoming network connection requests. Once an incoming network connection request is received, the system can identify which sub-port 251-259 is used for establish connection in the incoming network connection request. For example, a multiplexer 212 can read the beginning of the socket streams from the incoming network connection request and obtain port address values for the sub-ports 251-259. Then, a corresponding multiplexed socket 201-209 can be used in order to establish a connection via the particular sub-port 251-259.

Furthermore, a server environment 200, such as a distributed data grid, can use the port multiplexing mechanism for providing scalability, i.e. using more threads to process various sockets. Multiple independent services 241-249 can run in a single server process 240, e.g. a JAVA process, with each different service 241-249 utilizing different sub-ports 251-259. Also, communication based on different transportation protocols can be established via different sub-ports 251-259 through the same physical port 250.

For example, in a Coherence data grid, the sub-port 251, or port 80.1, can be designated for receiving Hypertext Transfer Protocol (HTTP) requests, and the sub-port 252, or port 80.2, can be designated for receiving Coherence Tangosol Cluster Management Protocol (TCMP) requests. Within the server environment, the multiplexed socket 201, which is corresponding to the sub-port 251, can be provided with a specialized socket implementation for handling HTTP requests. Additionally, the multiplexed socket 202, which is corresponding to the sub-port 252, can be provided with a specialized socket implementation for handling TCMP requests.

Furthermore, a multiplexed socket provider 210, such as a MultiplexedSocketProvider in Coherence, can be responsible for providing different socket implementations for the multiplexed sockets 201-209. The multiplexed socket provider 210 can also provide one or more non-multiplexed sockets, e.g. Socket A 220. In one example, the non-multiplexed socket A 220 produced by the multiplexed socket provider 210 can communicate with standard sockets, while multiplexed sockets 201-209 can communicate with other multiplexed socket instances.

In accordance with an embodiment of the invention, the multiplexed socket provider 210 can utilize extended port values to support the multiplexing of sockets. Used by the incoming network connection request, the port address may be specified in the format of either "host:port", or "host:base.sub". For example, the "host:port" address can represent an explicit 32 bit port value, and the "host:base.sub" address can represent the port as two 16 bit values, from which a 32 bit port can be computed. In both cases, the server environment 200 can support 65K physical ports, with each physical port having 65K sub-ports.

The multiplexed socket provider 210 can make use of an extended port value, such as an InetSocketAddress32 based addresses, for implementing various sub-port address schemes. An InetSocketAddress32 based address, which can be extended from the standard InetSocketAddress, can support 32 bit port numbers, which includes the 16 bit port numbers used in the standard InetSocketAddress.

Thus, the port address value can be configured in two ranges. For example, the port address value range from 0x00000000 to 0x0000FFFF can be mapped directly to standard Internet based addresses, i.e. to the non-multiplexed sockets. Additionally, the port address value range from 0x00010000 to 0xFFFFFFFF can be mapped to the multiplexed sockets.

For example, when a multiplexed socket port is used, the upper sixteen bits represent the actual Internet port binding, and the lower sixteen bits represents the sub-port or channel within the actual socket. Here, a sub-port 0 represents a sub-ephemeral address, i.e. a value of 0x500000 represents an ephemeral sub-port on the physical port 80, while a value of 0x500001 represents sub-port 1 on port 80.

On the other hand, when a non-multiplexed socket port is used, the upper sixteen bits represent the actual Internet port binding, and the lower sixteen bits can be disregarded.

Furthermore, the special address 0xFFFFFFFF (−1) can be used to represent a double ephemeral port, which means an ephemeral sub-port within an ephemeral port. When a double ephemeral port is specified, the multiplexed socket provider 210 may attempt to minimize the total number of real ports opened, i.e. it may only use one real port for all such requests. Furthermore, client sockets may not support local port bindings for ports above 0xFFFF.

Additionally, sub-ports in the range of 1 to 1023 inclusive can be consider as well-known addresses and may not be available for general use. For example, to make use of a sub-port in this range, the application need to be associated with a service and recorded in the MultiplexedSocketProvider.WellKnownSubPorts enumerates. Thus, the applications generally use ephemeral sub-ports, or sub-ports of 1024 or greater.

In accordance with an embodiment of the invention, an application programming interface (API) can be provided in the server environment 200 for various network applications. Using the API, different applications can be unaware of the port multiplexing and do not need to know the details in handling different communication protocols. The server environment allows for providing a separate socket implementation for a different type of connection instead of modifying the application logic implemented in the applications.

Also as shown in FIG. 2, the server environment 200 can be associated with a firewall 230 for various security reasons. The Administrator can configure the firewall 230 in order to establish network connections from outside the network. Using port multiplexing, the server environment 200 can reduce the number of physical ports that are needed to be maintained by IT professionals, e.g. reducing the load for configuring firewall 230.

Figure 3:
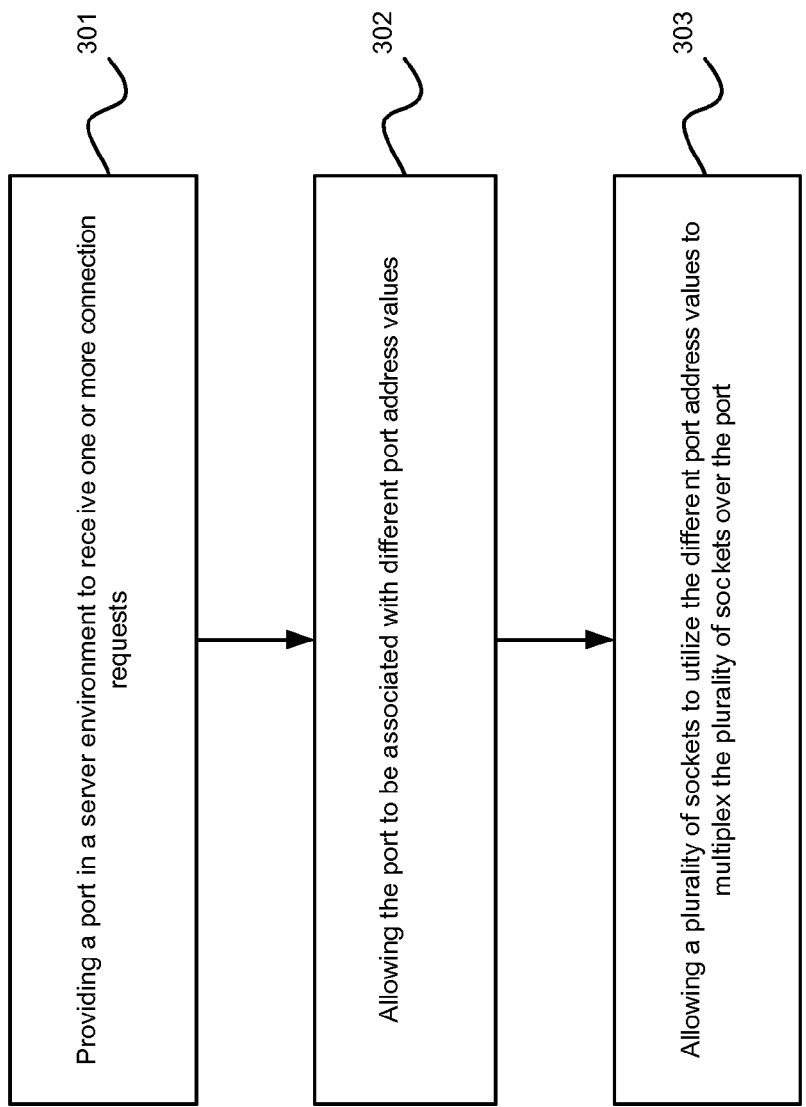
FIG. 3 illustrates an exemplary flow chart for supporting port multiplexing in a server environment, in accordance with an embodiment of the invention.

FIG. 3 illustrates an exemplary flow chart for supporting port multiplexing in a server environment, in accordance with an embodiment of the invention. As shown in FIG. 3, at step 301, the server environment can provide a port in a server environment to receive one or more connection requests. Furthermore, at step 302, the server environment allows the port to be associated with different port address values. Additionally, at step 303, the server environment allows a plurality of sockets to utilize the different port address values to multiplex the plurality of sockets over the port.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting port multiplexing in a server environment comprising a plurality of services running on a single server process, the method comprising:
    providing a port in the server environment;
    providing a multiplexed socket provider which provides a plurality of multiplexed sockets associated with the port;
    associating the port with a plurality of different port address values identifying a plurality of sub-ports of the port each of the plurality of sub-ports being associated with a corresponding one of the plurality of multiplexed sockets;
    designating a different sub-port of said plurality of sub-ports for each of the plurality of services; and
    receiving a plurality of connection requests at the port;
    in response to each of the plurality of connection requests, reading a particular port address value from said each connection request,
    identifying a particular sub-port of the plurality of sub-ports associated with the particular port address, and
    establishing a connection via the particular sub-port with a particular socket corresponding to the particular sub-port.

2. The method according to claim 1, further comprising:
    providing with said multiplexed socket provider a first socket of the plurality of multiplexed sockets wherein the first socket is configured to handle Hypertext Transfer Protocol (HTTP) requests; and
    designating a first sub-port of said plurality of sub-ports for receiving HTTP requests wherein the first sub-port is associated with the first socket.

3. The method according to claim 2, further comprising:
    providing with said multiplexed socket provider a second socket of the plurality of multiplexed sockets wherein the second socket is configured to handle Tangosol Cluster Management Protocol (TCMP) requests; and
    designating a second sub-port of said plurality of sub-ports for receiving TCMP requests wherein the second sub-port is associated with the second socket.

4. The method according to claim 1, further comprising:
    providing with said multiplexed socket provider at least one non-multiplexed socket configured to communicate with other non-multiplexed sockets; and
    wherein said plurality of multiplexed sockets is configured to communicate with other multiplexed sockets.

5. The method according to claim 1, wherein associating the port with a plurality of different port address values comprises:
    associating the port with a plurality of different port address values wherein each of the plurality of different port values includes a first 16 bit value which defines and Internet Protocol port binding for the port, and a second 16 bit value which identifies a sub-port of the plurality of multiplexed sub-ports.

6. The method according to claim 5, wherein the first 16 bit value of each of the plurality of different port address values is an InetSocketAddress for the port.

7. The method according to claim 1, further comprising:
    supporting a double ephemeral port, which is an ephemeral sub-port within another ephemeral sub-port.

8. The method according to claim 1, further comprising:
    providing scalability by using a plurality of threads to process the plurality of multiplexed sockets.

9. The method according to claim 1, further comprising:
    providing an application programming interface (API) in the server environment to support port multiplexing.

10. A system for supporting port multiplexing, the system comprising:
    a server environment comprising one or more microprocessors;
    a plurality of services running on a single server process of the server environment;
    a port provided in the server environment;
    a multiplexed socket provider associated with the port wherein the multiplexed socket provider provides a plurality of multiplexed sockets associated with the port and a multiplexer;
    a plurality of different port address values identifying a plurality of sub-ports of the port each of the plurality of sub-ports being associated with a corresponding one of the plurality of multiplexed sockets;
    wherein a different sub-port of said plurality of sub-ports is designated for each of the plurality of services;
    wherein the port and multiplexed socket provider are configured to receive a plurality of connection requests at the port and, in response to each of the plurality of connection requests, the multiplexer of the multiplexed socket provider is configured to read a particular port address value from said each connection request, identify a particular sub-port of the plurality of sub-ports associated with the particular port address, and establish a connection via the particular sub-port with a particular socket corresponding to the particular sub-port.

11. The system according to claim 10, wherein:
the plurality of multiplexed sockets include a first socket wherein the first socket is configured to handle Hypertext Transfer Protocol (HTTP) requests; and
a first sub-port of said plurality of sub-ports is designated for receiving HTTP requests wherein the first sub-port is associated with the first socket.

12. The system according to claim 11, wherein:
the plurality of multiplexed sockets include a second socket wherein the second socket is configured to handle Tangosol Cluster Management Protocol (TCMP) requests; and
a second sub-port of said plurality of sub-ports is designated for receiving TCMP requests wherein the second sub-port is associated with the second socket.

13. The system according to claim 10, further comprising:
at least one non-multiplexed socket provided by said multiplexed socket provider, wherein said at least one non-multiplexed socket is configured to communicate with other non-multiplexed sockets; and
wherein said plurality of multiplexed sockets is configured to communicate with other multiplexed sockets.

14. The system according to claim 10, wherein each of the plurality of different port values includes a first 16 bit value which defines and Internet Protocol port binding for the port, and a second 16 bit value which identifies a sub-port of the plurality of multiplexed sub-ports.

15. The system according to claim 14, wherein the first 16 bit value of each of the plurality of different port address values is an InetSocketAddress for the port.

16. The system according to claim 10, further comprising:
a plurality of threads to process the plurality of multiplexed sockets thereby providing scalability to said system.

17. The system according to claim 10, further comprising:
an application programming interface (API) configured to support multiplexing in the server environment.

18. A nontransitory computer readable medium having instructions stored thereon for supporting port multiplexing in a server environment comprising a port and a plurality of services running on a single server process, which instructions, when executed cause the server environment to perform steps comprising:
providing a multiplexed socket provider which provides a plurality of multiplexed sockets associated with the port;
associating the port with a plurality of different port address values identifying a plurality of sub-ports of the port each of the plurality of sub-ports being associated with a corresponding one of the plurality of multiplexed sockets;
designating a different sub-port of said plurality of sub-ports for each of the plurality of services; and
receiving a plurality of connection requests at the port;
in response to each of the plurality of connection requests, reading a particular port address value from said each connection request,
identifying a particular sub-port of the plurality of sub-ports associated with the particular port address, and
establishing a connection via the particular sub-port with a particular socket corresponding to the particular sub-port.

19. A method for supporting port multiplexing in a server environment, the method comprising:
providing a port in the server environment;
providing a multiplexed socket provider which provides a plurality of multiplexed sockets associated with the port, wherein said plurality of multiplexed sockets includes a first socket configured to handle Hypertext Transfer Protocol (HTTP) requests;
associating the port with a plurality of different port address values identifying a plurality of sub-ports of the port each of the plurality of sub-ports being associated with a corresponding one of the plurality of multiplexed sockets;
designating a first sub-port of said plurality of sub-ports for receiving HTTP requests wherein the first sub-port is associated with the first socket; and
receiving a plurality of connection requests at the port;
in response to each of the plurality of connection requests, reading a particular port address value from said each connection request,
identifying a particular sub-port of the plurality of sub-ports associated with the particular port address, and
establishing a connection via the particular sub-port with a particular socket corresponding to the particular sub-port.

20. A system for supporting port multiplexing, the system comprising:
a server environment comprising one or more microprocessors;
a port provided in the server environment;
a multiplexed socket provider associated with the port wherein the multiplexed socket provider provides a plurality of multiplexed sockets associated with the port and a multiplexer, wherein said plurality of multiplexed sockets includes a first socket configured to handle Hypertext Transfer Protocol (HTTP) requests;
a plurality of different port address values identifying a plurality of sub-ports of the port each of the plurality of sub-ports being associated with a corresponding one of the plurality of multiplexed sockets;
wherein a first sub-port of said plurality of sub-ports is designated for receiving HTTP requests wherein the first sub-port is associated with the first socket;
wherein the port and multiplexed socket provider are configured to receive a plurality of connection requests at the port and, in response to each of the plurality of connection requests,
the multiplexer of the multiplexed socket provider is configured to read a particular port address value from said each connection request, identify a particular sub-port of the plurality of sub-ports associated with the particular port address, and establish a connection via the particular sub-port with a particular socket corresponding to the particular sub-port.

21. A nontransitory computer readable medium having instructions stored thereon for supporting port multiplexing in a server environment comprising a port, which instructions, when executed cause the server environment to perform steps comprising:
providing a multiplexed socket provider which provides a plurality of multiplexed sockets associated with the port, wherein said plurality of multiplexed sockets includes a first socket configured to handle Hypertext Transfer Protocol (HTTP) requests;
associating the port with a plurality of different port address values identifying a plurality of sub-ports of the port each of the plurality of sub-ports being associated with a corresponding one of the plurality of multiplexed sockets;

designating a first sub-port of said plurality of sub-ports for receiving HTTP requests wherein the first sub-port is associated with the first socket; and receiving a plurality of connection requests at the port;

in response to each of the plurality of connection requests,
reading a particular port address value from said each connection request,
identifying a particular sub-port of the plurality of sub-ports associated with the particular port address, and
establishing a connection via the particular sub-port with a particular socket corresponding to the particular sub-port.

* * * * *